United States Patent
Howard et al.

(10) Patent No.: US 6,841,007 B1
(45) Date of Patent: Jan. 11, 2005

(54) METHOD FOR PIPELINE FILTRATION

(76) Inventors: James A. Howard, 3018 Silent Spring, Sugar Land, TX (US) 77479; John R. Hampton, 3614 Sierra Pines, Houston, TX (US) 77068; Greg P. Wallace, 202 Imperial Bend La., Katy, TX (US) 77493

( * ) Notice: Subject to any disclaimer, the term of this patent is extended or adjusted under 35 U.S.C. 154(b) by 0 days.

(21) Appl. No.: 10/167,029

(22) Filed: Jun. 11, 2002

(51) Int. Cl.$^7$ ................................................ B08B 7/00
(52) U.S. Cl. ..................... 134/8; 134/10; 15/3.51; 15/104.05; 15/104.061; 15/104.062; 15/210; 15/232
(58) Field of Search .................... 134/8, 10; 15/3.51; 15/104.05, 104.061, 104.062; 210/232

(56) References Cited

U.S. PATENT DOCUMENTS

| | | |
|---|---|---|
| 2,647,636 A | 8/1953 | Rafferty |
| 3,300,050 A | 1/1967 | Perry |
| 3,355,021 A | 11/1967 | Jones |
| 3,622,006 A | 11/1971 | Brunner |
| 4,316,802 A | 2/1982 | Howell |
| 4,954,252 A | 9/1990 | Griffin et al. |
| 5,223,136 A | 6/1993 | Gilbert |
| 5,980,645 A | * 11/1999 | Price .............................. 134/8 |
| 5,992,643 A | 11/1999 | Scrogham et al. |
| 6,001,242 A | 12/1999 | England et al. |
| 6,177,010 B1 | 1/2001 | Schamel et al. |

* cited by examiner

Primary Examiner—Zeinab EL-Arini

(57) ABSTRACT

A method for cleaning a pipline by providing a filter or a number of filters adapted to reside in the pig launcher of the pipeline. The filters can be used to remove debris and impurities from the fluid flowing in the pipeline during a pigging operation. Alternatively, the filters may be retained in the pig launcher for extended periods of time.

10 Claims, 11 Drawing Sheets

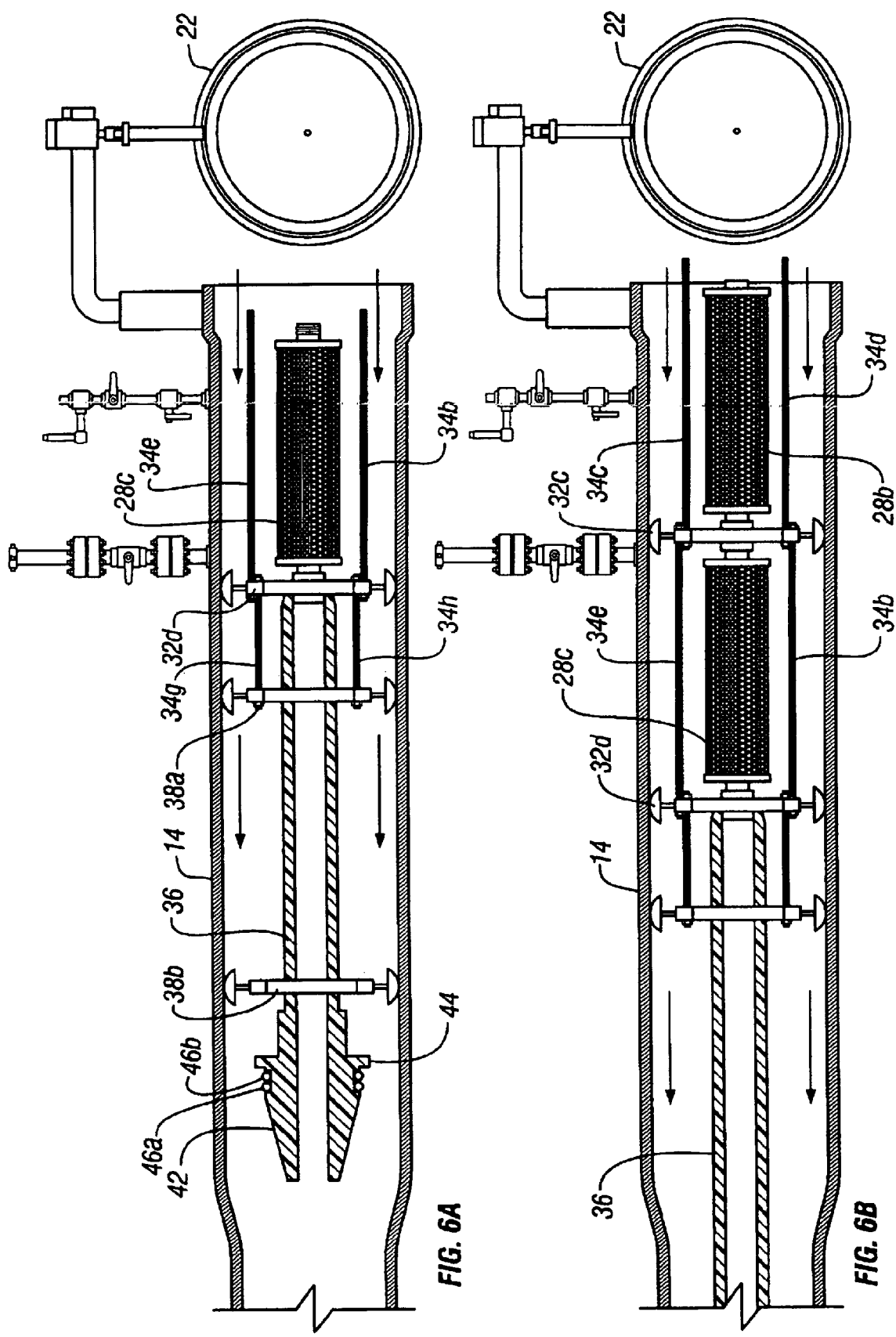

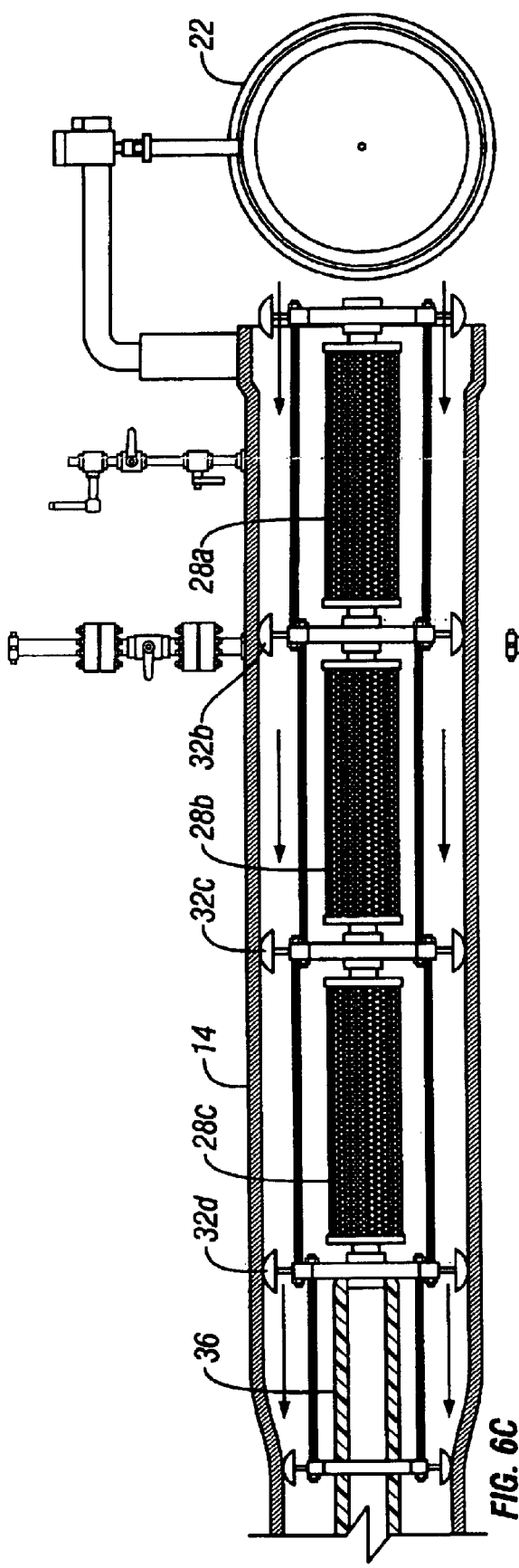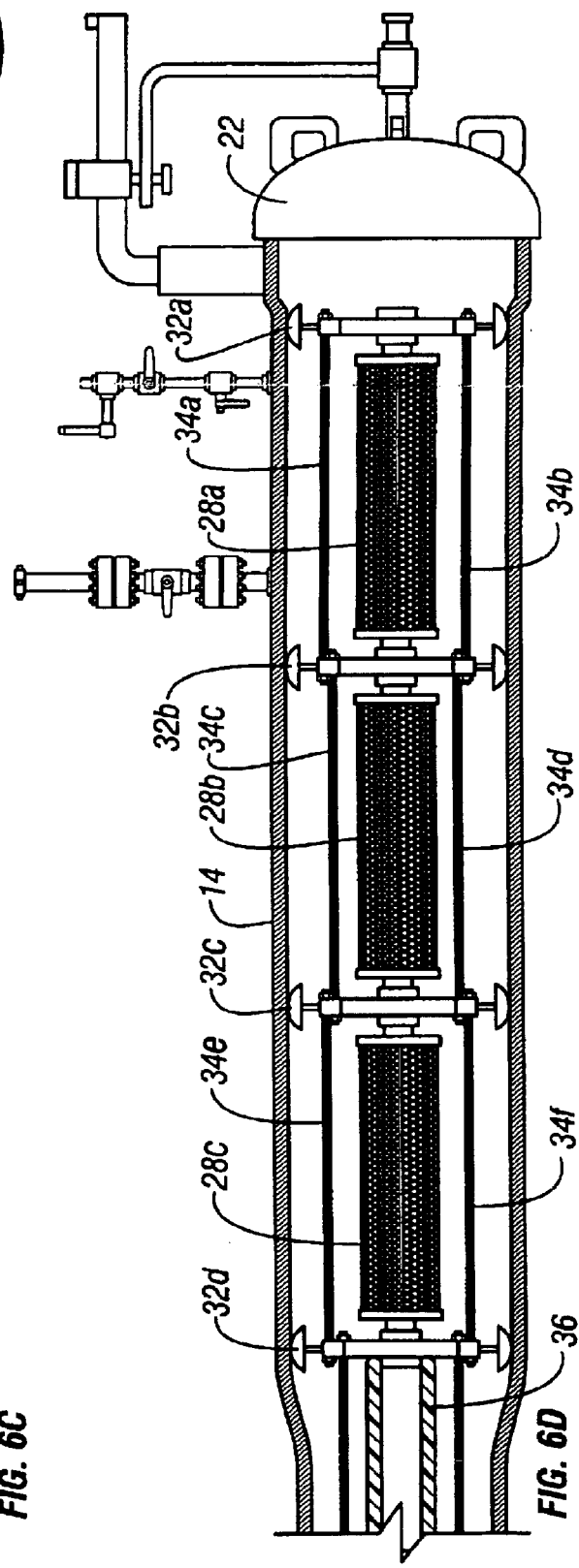
FIG. 6C
FIG. 6D

US 6,841,007 B1

METHOD FOR PIPELINE FILTRATION

BACKGROUND OF THE INVENTION

Pipelines can cover great distances in transporting a variety of products, primarily petroleum fluids such as natural gas, crude oil and refined products. The pipelines can have build-ups of impurities, such as corrosion, and foreign particles, such as dirt, on the inside of the pipeline that can hamper transmission and contaminates the product transported in the pipeline. Also, with raw materials transported on pipelines there can be naturally occurring impurities that occur and impede the transmission of the fluids. Also, increased power costs are incurred when fluid with impurities is transported through a pipeline.

There are different approaches to cleaning the inside of the pipeline while not disrupting the transmission of the fluids. One method is the use of a short cylindrical body known as a pipeline pig that has on outside diameter that fits inside the pipe. The outer surface of the pig scrapes off the build up of contaminates on the inside of the pipeline and the contaminates are carried with the fluid through the pipeline. The pigs are so commonly used that modifications in the pipelines called pig launchers and pig receiver units are built into the pipelines often every 50 to 70 miles or so. The pig launcher and receiver units are above ground and easily accessible while the pipeline may or may not be above ground. The launcher and receiver units have piping arrangements so that the pig enters the pipeline without disrupting the fluid flow and can be retrieved, cleaned and redeployed.

The contaminates in the fluid can be kept in suspension and filtered at the end of the pipeline or are carried in the fluid and can cause contamination problems at a plant receiving the product. Dirt in the fluid can clog trays in the processing of a petrochemical product. In order to remove the contaminates in the transport process, external high pressure filter units are used and the fluid is diverted from the pipeline for filtering. This process is expensive and requires special filter units along the pipeline to be assured of clean fluid transport.

SUMMARY OF THE INVENTION

This invention is a method of filtering the fluid in a pipeline without disrupting the fluid flow and using existing pig launchers for filter apparatus. The modification of the existing pipeline structure is minimal and required to external high pressure filtering apparatus.

The method includes introducing a filter into the pig Launcher or receiver. The filters are sized to fit inside the launcher body and any adjacent pipe. If needed, an extension known as spool can be attached to the launcher body to accommodate the additional filters. The fluid from the pipeline enters the launcher body that contains the filters. The filter is secured in the launcher body so it will remain in place during the filtering process. Typically, the filters used in this invention are outside/in filters so that the fluid passes through the filter media and enters a fluid permeable central core. The filter media traps the impurities and the filtered fluid passes through the central core through a conduit from the central core to resume travel through the pipeline.

More than one filter may be used. Typically more than one filter is used and an assembly is made of several filters in a filter cartridge carrier assembly. The filters are connected with a pressure tight connection from the core exiting the filter and the core entering the adjacent filter in a series along the length of the launcher. The terminal filter of cartridge carrier assembly adjacent to the downstream pipeline entrance introduces the filtered fluid from the central core to the pipeline. The filter at the opposite end of the filter cartridge carrier assembly has a cap on the core opening that is not connected to the adjacent filter. As an option, a rupture plate can be placed on the end of the filter instead of a cap. This allows for the plate to rupture in case the filters become clogged and the differential pressure build up to a certain level, allowing the unfiltered fluid to pass through the core and the pipeline.

Another multiple filter arrangement includes mounting multiple filters in a series such that more than one filter fits into the inner diameter of the launcher body or the pipe associated with the launcher body. The cores of each filter are connected in a parallel fashion along the horizontal length of the body holding the filters. At the end of the parallel series there is a collector that attached to the core of each of the terminal filters and passes the fluid to the pipeline.

The filtering process can take place before or after a pig has traveled through the pipeline to dislodge impurities. Once the filtering operation has been accomplished, the filters can be removed from the launcher body and a pig can be redeployed. Or the filters can be placed in the launcher and used without the pigging operation. The filters can be deployed temporarily for a short period of time during the pipeline cleaning process using a pig to filter out the impurities dislodged during the cleaning process or for longer periods of time regardless of whether a pig is used.

To utilize the new method, the only modification to the pipeline is the insertion of a sump plate in a flange downstream to the pig launcher. The sump plate or equivalent structure is adapted to receive the filtered fluid.

BRIEF DESCRIPTION OF THE DRAWINGS

FIGS. 6a, 6b, 6c and 6d show the insertion of a filter into the pig launcher.

DETAILED DESCRIPTION OF THE INVENTION

Figure 1:
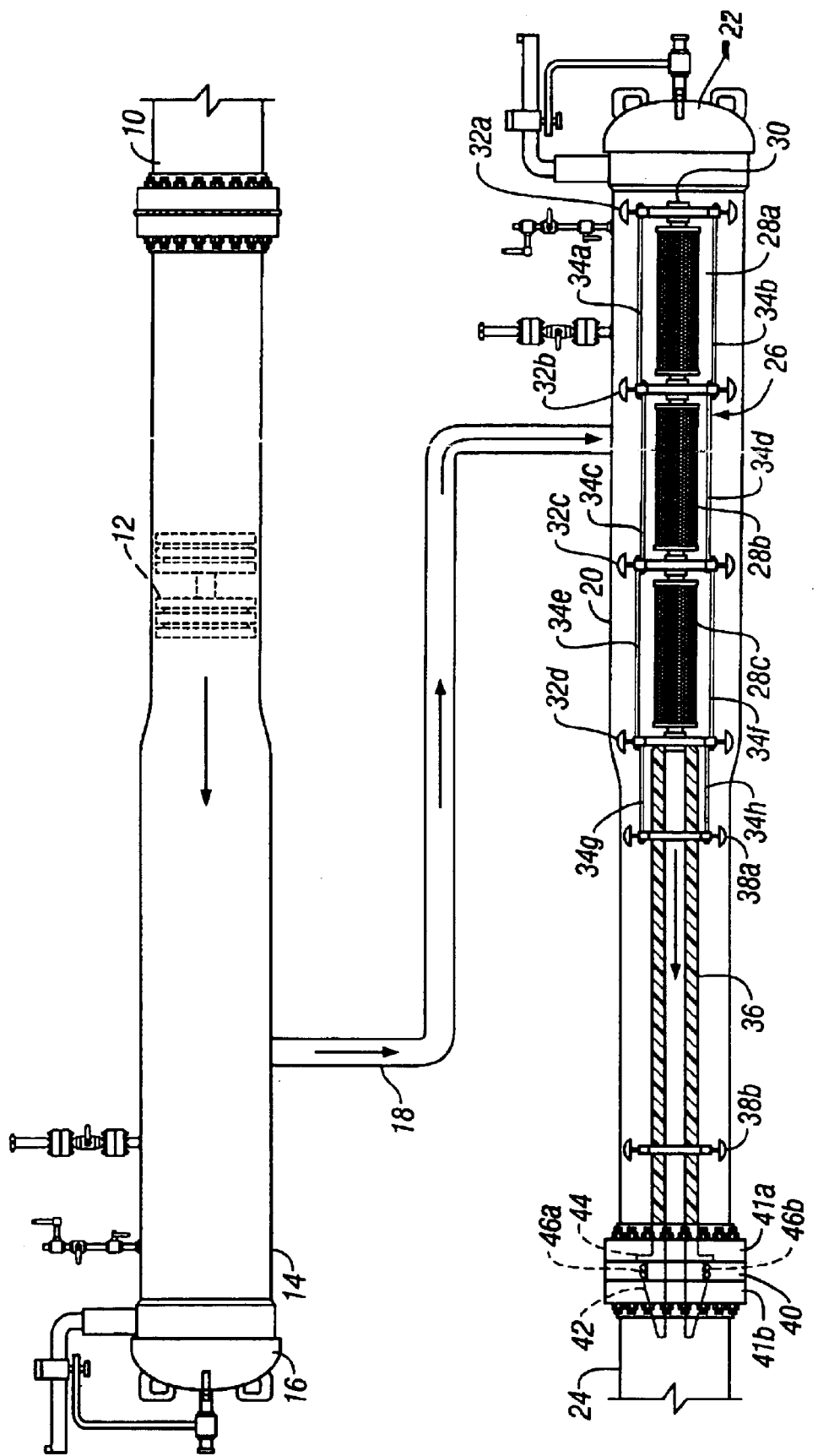
FIG. 1 shows a pig receiver and the by-pass piping to the pig launcher which is cut away to show one embodiment of the filters.

The arrangement in FIG. 1 illustrates the features of practicing the method of the invention. Fluid is passing through the pipeline 10. A pig device 12, which is generally a short cylindrical body, is shown passing through the pipeline. Generally, the outer diameter of the pig is sized to fig snuggly inside the pipeline. The pig 12 is carried by the fluid pressure through the pipeline 10 to remove dirt, debris and corrosion, and ultimately ends its travel through the pipeline 10 at pig receiver 14. The pig receiver 14 is generally a cylindrical body at the end of the pipeline 10 that terminates with a pig receiver opener 16 that can be swung open to remove the pig once it completes its travel through the pipeline. The normal vent valves are shown but not numbered on the pipeline and pig receiver 14.

There is a bypass line 18 that connects the pig receiver 14 to the pig launcher body 20. The pig launcher body 20 is shown with the standard vent valves that are not numbered. The pig launcher body 20 is cylindrical and has the pig launcher opener 22 at one end. The other end of the pig launcher body is attached to the pipeline 24, which resumes carrying the fluid downstream to the destination. In FIG. 1, the pig launcher body is shown cut away with a filter cartridge carrier assembly generally indicated at 26. The filter assembly 26 is composed of three filters 28a, 28b and 28c that are arranged in a linear fashion inside the pig launcher body 20. Filter 28a is the terminal filter next to the pig launcher opener 22 and has a cap 30 on the terminal end of the outlet of the filter. The cap 30 may be replaced with a rupture plate that will break when the differential pressure exceeds a predetermined level. The filters shown in FIG. 1 are outside/in filters with filter media surrounding a central core that is fluid permeable. The central core is connected to an inlet and outlet of the filter that is not fluid permeable.

Filter 28a is held in place in the pig launcher body in part by filter centralizer body 32a. The filter centralizer body has legs extending from a generally circular disc such that the legs are sized to hold the filter in the pig launcher body during the filtering process. The legs do not have to have a close tolerance to the inside of the pig launcher body, but provide support and stability for the filters. The filter centralizers also have a central opening sized to receive the filter inlet or outlet as shown in more detail in FIG. 3. The filter centralizers also have openings to receive tie rods on their outer perimeter for connecting the multiple filter centralizers. Filter 28b is connected to filter 28a with filter centralizer 32b. Tie rods connecting filter stabilizer 32a to 32b in FIG. 1 are shown at 34a and 34b. Similarly, tie rods 34c, 34d, 34e and 34f connect the filter centralizers 32b, 32c and 32d in the same manner. The outlet of filter 28a is received into the central opening of filter centralizer 32b, while the inlet to filter 28b is received on the other end of the opening, thereby providing fluid communication between the filters. Filter 28b outlet and filter 28c inlet are similarly connected with filter centralizer 32c in a pressure tight manner.

FIG. 1 shows three filters in the filter cartridge assembly 26. However, as shown elsewhere, as many filters as necessary can be used, and the arrangement in FIG. 1 is for illustrative purposes. The outlet of filter 28c is inserted into the central opening of filter centralizer 32d. The opposite end of the opening of 32d is connected to a tube conduit 36, which extends from the outlet of the filters and carries the filtered fluid. The tube conduit 36 also has centralizers 38a and 38b to support it inside the extension of the pig launcher, which as shown in FIG. 1 may have a smaller diameter than the pig launcher body. The centralizers are sized to hold the conduit tube in place. The terminal end of the conduit tube going downstream is tapered and fitted with O-rings to slide into sump plate 40 as shown in FIG. 1.

Sump plate 40 is held between flanges 41a and 41b and is the only modification to the pipeline that needs to be made to practice the method of this invention. Sump plate 40 has a smaller diameter than the flange and pipeline opening. The tube conduit 36 is adapted to fit tightly in the sump plate because it has a tapered end 42 that can be guided into the sump plate 40. There is a collar 44 at the end of the taper to stop the travel of the conduit tube 36 into the sump plate 40. The sump plate 40 is fitted with O-rings shown at 46a and 46b. The sump plate arrangement is a convenient way to secure the flow of the filtered fluid to the downstream pipeline 48. However, other means known to those skilled in the art can be used to practice the method of this invention.

Figure 2:
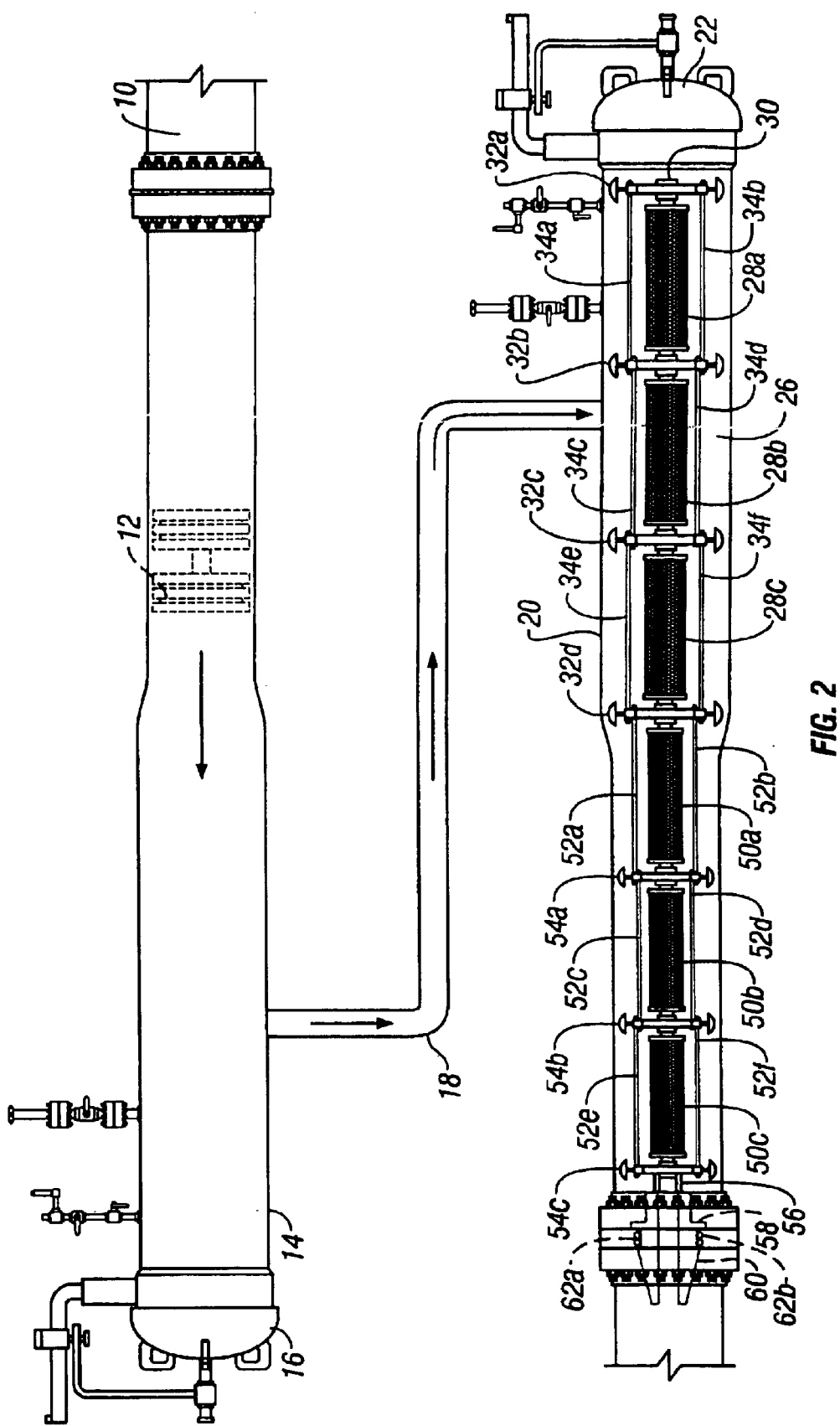
FIG. 2 shows a pig receiver and the by-pass piping to the pig launcher which is cut away to show an embodiment of the filters.

FIG. 2 is an embodiment of the invention with additional filters of smaller relative diameters shown. For ease of reference, the same numerals will be used for the corresponding parts, and new numerals will be used for the additional filters. There are three additional filters shown as 50a, 50b and 50c that are shorter and smaller in diameter relative to filters 28a, 28b and 28c, illustrating the feature of the method that any size or number of filters may be used. The additional filters are connected in a linear manner in the pig launcher body 20 and the extension of that body that has a smaller diameter by using filter centralizers 54a, 54b and 54c of the same construction as previously described for FIG. 1. Similarly, the tie rods 52a, 52b, 52c, 52d, 52e and 52f connect the central stabilizers.

Filter 50c is the terminal downstream filter in FIG. 2. The outlet of filter 50c is connected through the central opening of the stabilizer.

Figure 3:
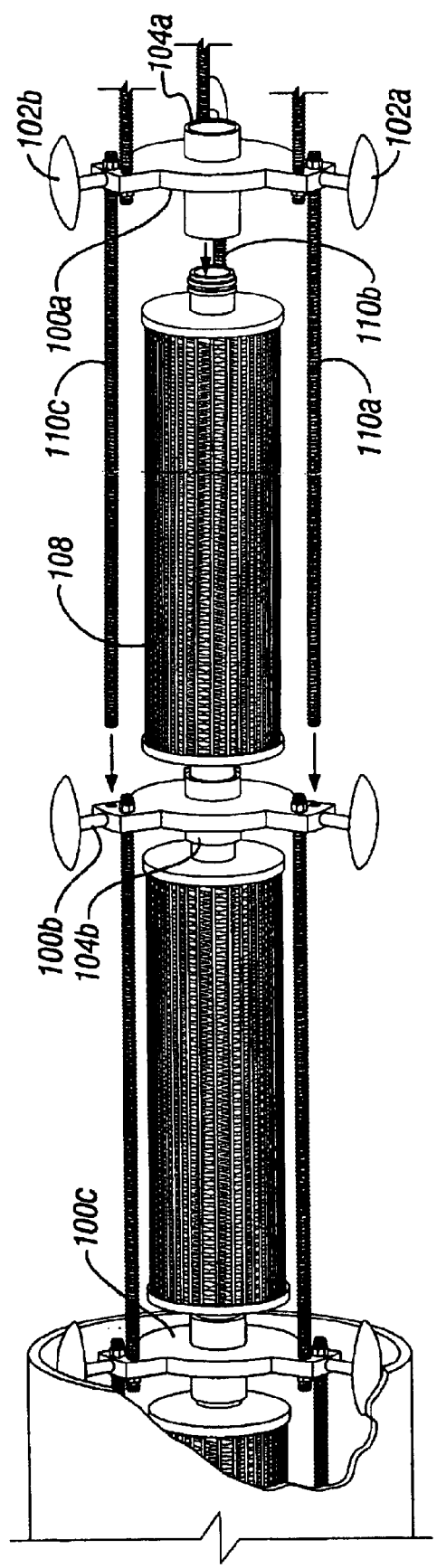
FIG. 3 is a detail of the filter cartridge carrier assembly with centralizers.

FIG. 3 is a detailed depiction of a portion of an embodiment of the filter cartridge carrier assembly 26 as shown in FIGS. 1 and 2. The filter centralizers are shown in greater detail with the leg extensions numbered 102a and 102b on filter centralizer 100a. The legs terminate in a flat, slightly rounded foot that can contact the inside of the pig launcher or receiver body holding the filter cartridge carrier assembly so that it is held safely within the body during fluid flow. The filter centralizers have tubular members extending through the central opening on either side of the filter centralizer. As the centralizers are fastened to the filters, they perform the dual purpose of maintaining the filter cartridge carrier assembly in the pig launcher or receiver body and attaching the filters to allow flow of pressurized fluid through the central cores of the attached filters in the assembly. The filter centralizer tubes fit tightly on the filter inlets and outlets which are shown, and are provided with O-rings as shown on filter 108 in FIG. 3. Any other means of providing a pressure tight fit may be used. In FIG. 3, the filter 108 has an inlet tube that is shown with the O-ring neck that fits inside the filter centralizer tube 104a. The filters are joined with the filter centralizers between each filter as shown in detail in FIG. 3.

The filter centralizer bodies can also be provided with openings on their perimeter to receive tie rods to stabilize the filter cartridge assembly. As shown in FIG. 3, filter centralizer 100a has three pair of openings to receive tie rods that connect each adjacent filter stabilizer. Tie rods 110a, 110b and 110c connect filter centralizers 100a and 100b with three tie rods surrounding the outside of filter 108. The tie rods shown are threaded and extend the length of the filter 108 and through the filter centralizers 100a and 100b. The tie rods are fastened by a nut to secure the end of the tie rod that extends through the body of each of the filter centralizers 100a and 100b. The tie rods are not essential to the invention. Any method or apparatus to stabilize the filters can be used and are known to those skilled in the art.

Figure 4:
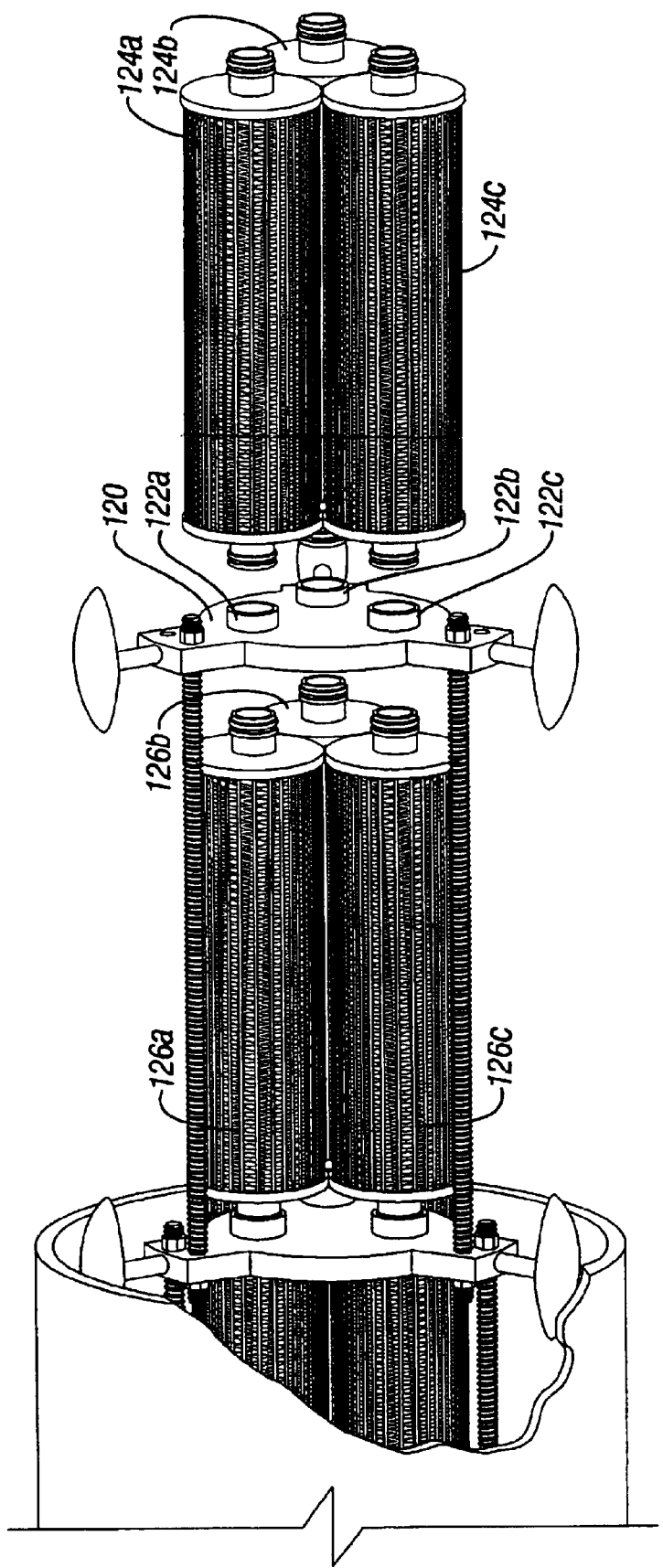
FIG. 4 is a detail of a multiple filter cartridge carrier assembly with centralizers adapted for use with the arrangement shown.

To further illustrate the invention, FIG. 4 is a detailed drawing of a filter cartridge carrier assembly that holds more than one filter in parallel. The figure shows three filters in parallel that are connected with filter centralizers in a similar fashion to FIG. 3. The parallel filter centralizer 120 has three openings, rather than one central opening, through which tubes extend on either side to connect with filter inlets and outlets. The parallel filter cartridge assembly can be used when the configuration of the pig launcher or receiver is sized to accompany this arrangement or when the need requires optimizing the number of fibers used. The parallel filter stabilizer body 120 is shown with the tubes 122a, 122b and 122c extending from the body of the stabilizer. These tubes fit tightly around the inlets and outlets of the inflow filters 124a, 124b and 124c, which are in parallel flow. Then the tubes connect to outflow filters 124a, 124b and 124c, respectively. The tie rod stabilizer arrangement is also shown in FIG. 4 and functions in the same manner as previously described.

Figure 5:
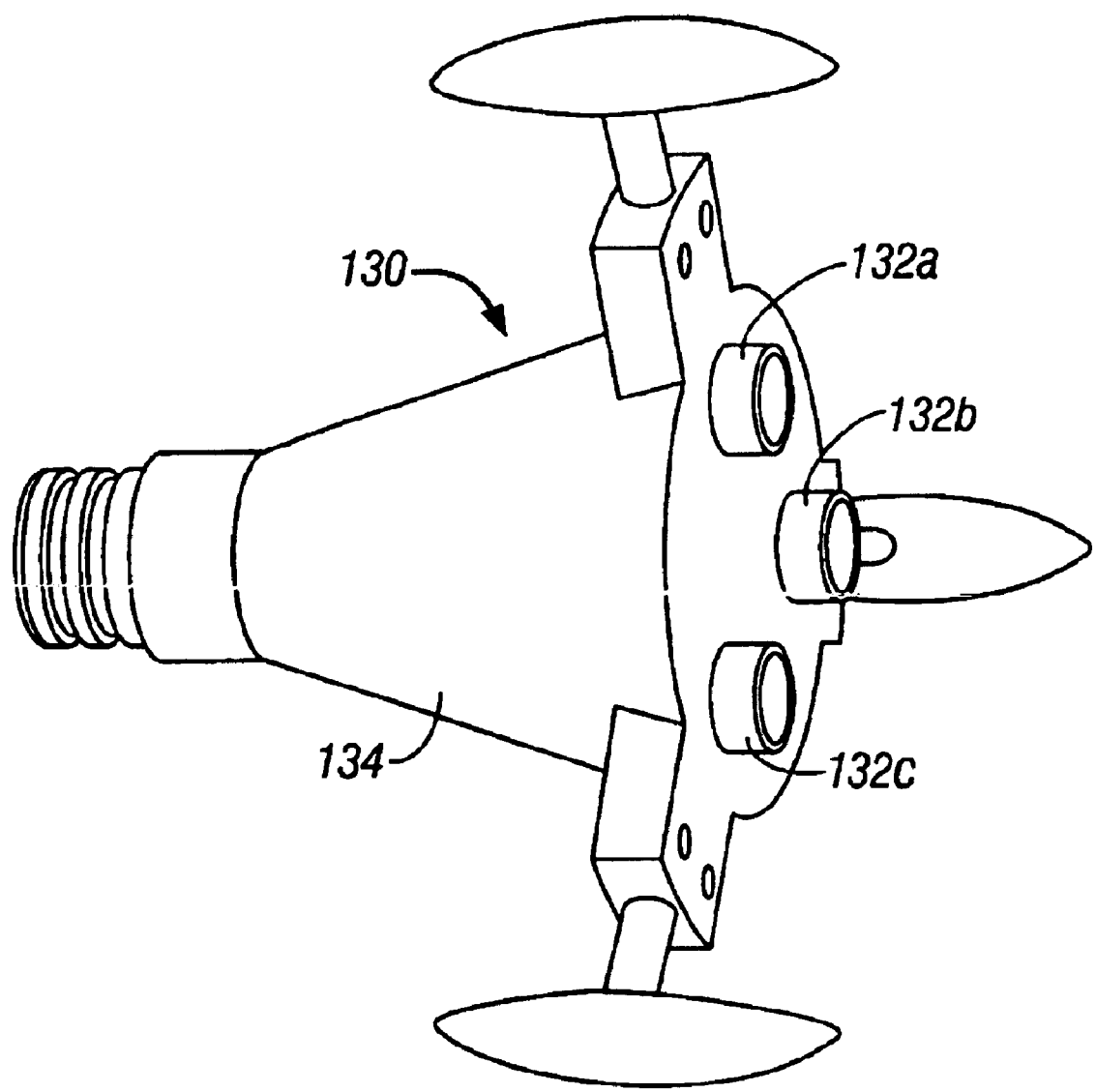
FIG. 5 is a perspective view of the terminal centralizer and fluid collector for the multiple cartridge assembly of FIG. 4.

At the terminal end of the filter cartridge for the parallel filter arrangement, a specialized filter centralizer 130 may be used as shown in FIG. 5. The centralizer has three tubes 132a, 132b and 132c extending from one end of the centralizer that feed the filtered fluid from the terminal filters into a conical body 134 extending from the centralizer that collects the filtered fluid from the terminal three filters in the parallel arrangement as shown in FIG. 4. The conical body 134 tapers to a round neck 136 that extends from the conical body and is fitted with grooves for O-rings so that it can connect with tube conduit and the fluid can resume travel through the pipeline. The arrangement shown in FIGS. 1 and 2 with the tapered conduit tube 36 with the tapered end 42 can be used. However, any type of pressure tight connectors may be used.

FIGS. 6A, 6B and 6D illustrate the ease in preparing the filter assembly cartridge and loading into a pig launcher. For ease of reference, the same numerals from FIGS. 1 and 2 are used. The filter flow to the pig launcher is halted, and the pig launcher opener 22 is swung to the open position to allow for entry of the filter cartridge assembly. The tube conduit with tapered end 42, with the collar securing the O-rings 46a and 46b, enter the pig launcher receiver body 14 first. The same arrangement of tube conduit centralizers 38a and 38b are used. The number of filters used to practice the invention depends on the desired filtration and the size of the pig launcher. If the pig launcher is not the desired length and needs to be longer to accommodate more filters, a cylindrical extension may be connected to the opening end of the pig launcher. These parts are known as "spools" and are connected to the end of the pig launcher with flange and gasket connections.

Any type of filter may be used depending on the fluid being transported and the impurities that need removal. The filters are typically cylindrical in shape. The filters illustrated in the figures are PLATINUM™ Series filters made by Filtration Technologies Corporation, and are fully described in U.S. Pat. No. 5,824,232, which patent is fully incorporated by reference herein. Filter 28c is stabbed into the tube in filter centralizer 32d in a pressure tight connection to provide communication of the filtered fluid from the core of filter 38c to the conduit tube 36. The centralizers are used to guide the filters in and out of the pig launcher body and/or the pipe holding the filters. The centralizers are sized to fit comfortably inside the pipe and support the filters. As shown in FIG. 6B, the filters are added to the assembly by use of a filter centralizer 32c to connect the filter 28b so that the cores of the filters communicate in a pressure tight connection. The tube conduit 36 travels through the pig launcher body. The number of filters and the length of the conduit tube are sized so that the tapered end 42 of conduit 36 will extend and seal into the sump plate as shown in FIGS. 1 and 2.

FIG. 6C shows the connection of the three filters 28a, 28b and 28c and their introduction into the pig launcher 14. In FIG. 6D the pig launcher opener 22 is swung to the closed position, and fluid can be introduced for filtration. The fluid enters from bypass line 18 as shown in FIGS. 1 and 2 into the pig launcher with the filter assembly secured inside. The fluid enters from the outside of the filters under pressure and through the selected filter media. The fluid then passes into the cores of each of the filters 28a, 28b and 28c. The filters are connected in the manner described so that the cores communicate the filtered fluid and passes it through the cores to the tube conduit 36. The filter fluid then resumes flow through the pipeline.

Figure 7:
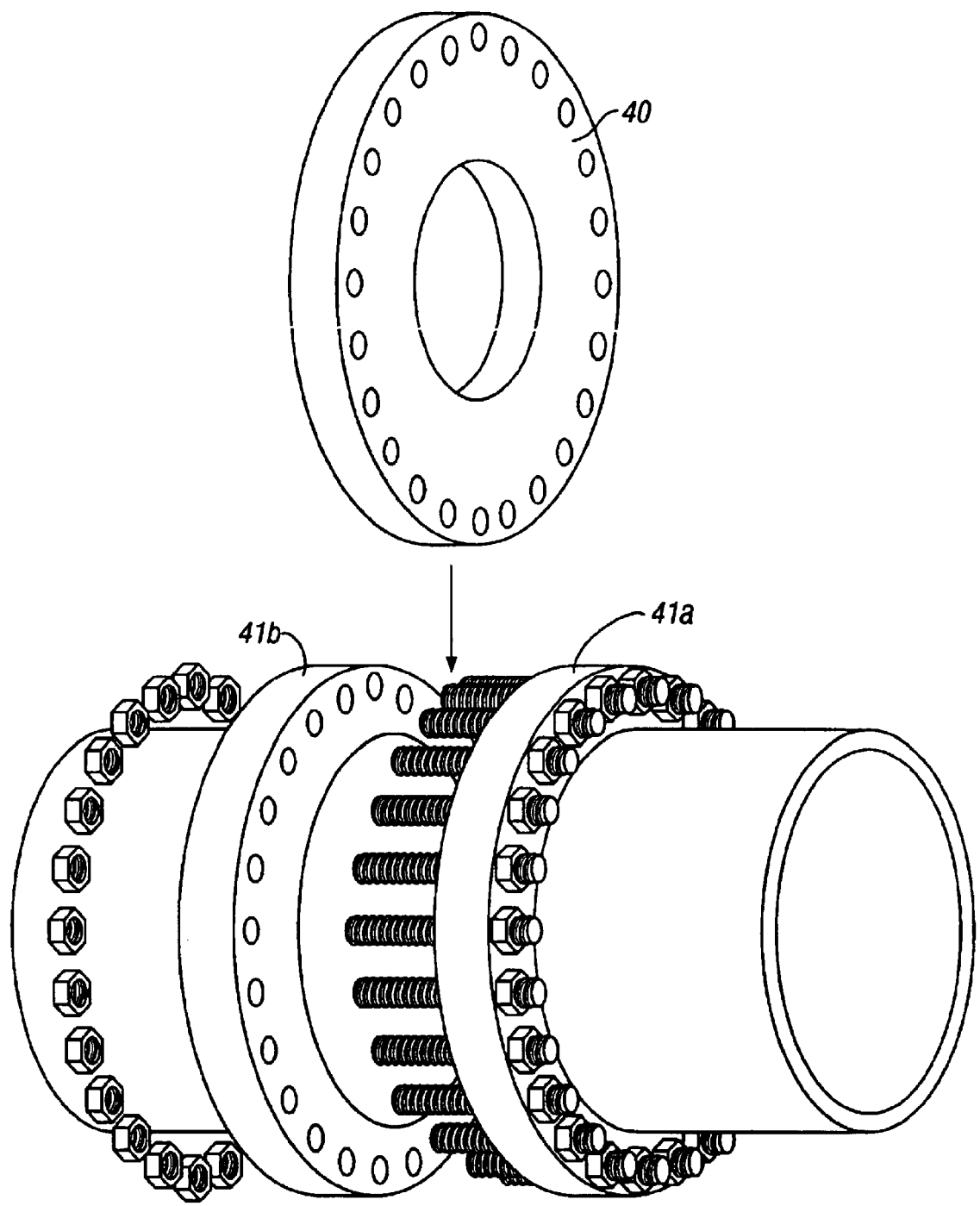
FIG. 7 is a perspective view of the installation of the sump plate in the flange.
Figure 8:
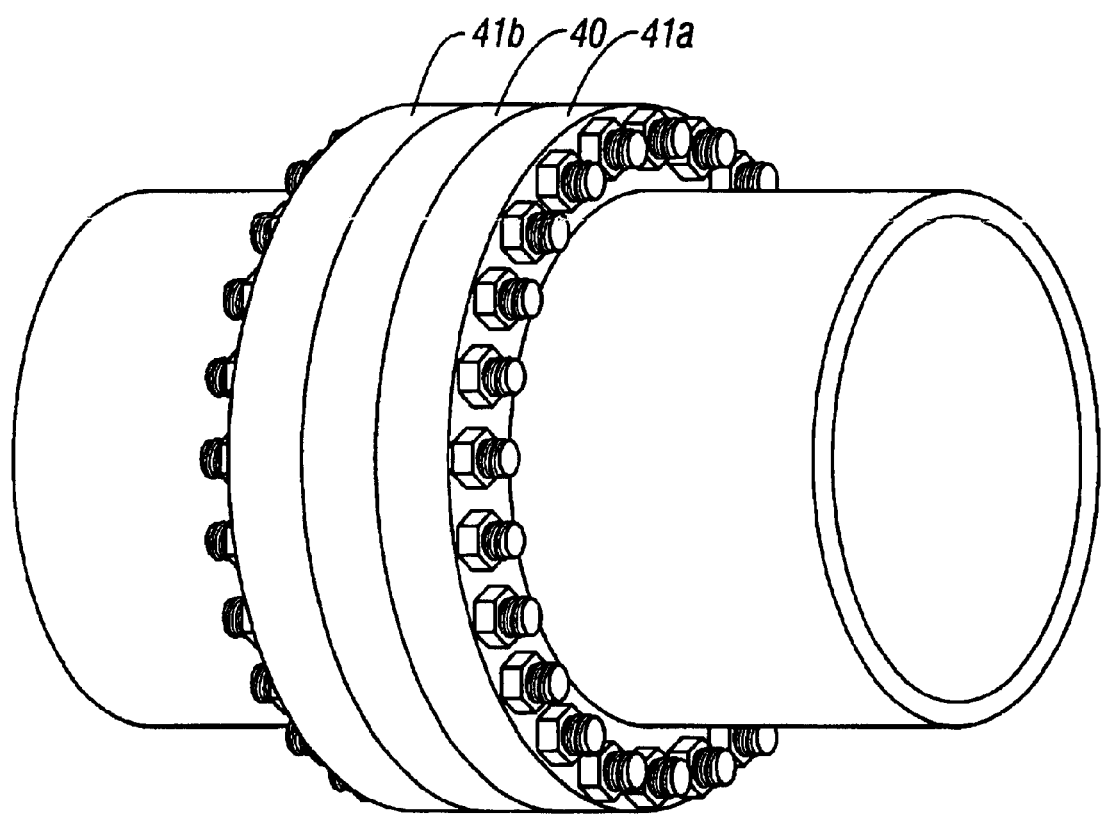
FIG. 8 is a view of the sump plate installed in the flange.

Typically, one modification of the pipeline is required to accommodate the invention. The tube conduit's tapered end 42 is secured in a sump plate 40 as shown in FIGS. 1 and 2. The sump plate 40 is placed at a flanged connection typically already present in the pipeline. FIGS. 7 and 8 show a detail of sump plate 40 that is inserted between flanges 41a and 41b and secured as shown in FIG. 8. The connection is pressure tight, and gaskets (not shown) of other means to provide a pressure tight connection can be made as commonly known to those skilled in the art.

Figure 9:
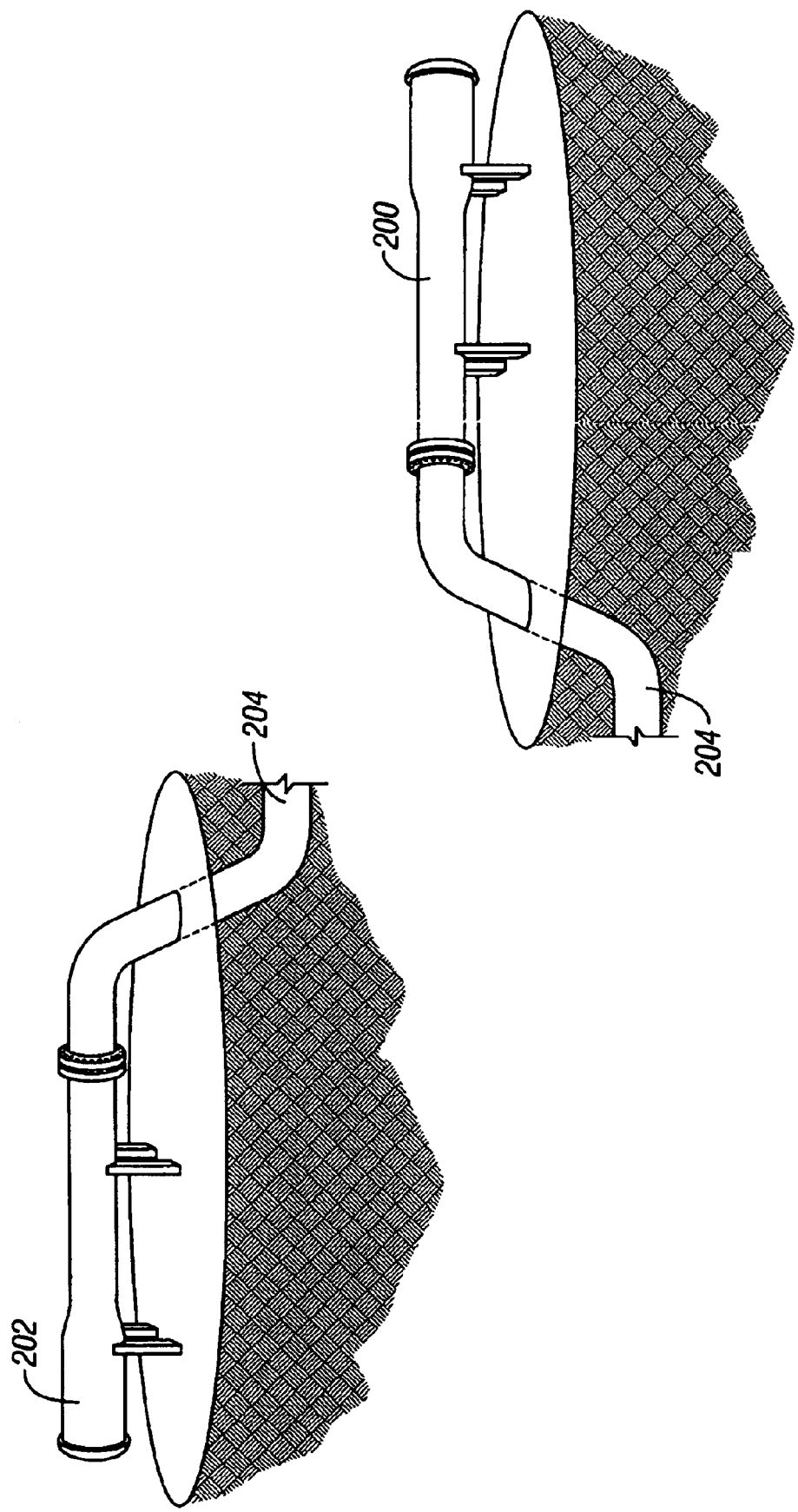
FIG. 9 is a schematic view of the placement of a pig launcher and receiver above ground relative to a buried pipe.

FIG. 9 is a schematic drawing of an underground pipeline with a pig launcher 200 and a pig receiver 202. The pipeline 204 is underground between the pig launcher and receiver. The various bypass lines are not shown. This drawing illustrates the case of using the method of the present invention to filter fluid in the pipeline without hauling a separate high pressure filtration to a site and having the installation difficulties using a separate filtration unit. The drawing also shows a pig launcher receiver 202 that can be used to house a filter cartridge carrier assembly and practice another variation of the method of this invention. The filtration method can be employed using the pig receiver to hold the filter cartridge assembly. This is especially useful at the end of the pipeline where there is no pig launcher. The filters are placed in the receiver in the same manner as described herein. Fluid flow would be directed to the outside of the filters, and the filtered fluid would be collected in the filter cores. The filtered fluid would then be collected and transferred to the processing plant or other line at the end of the pipeline.

Figure 10:
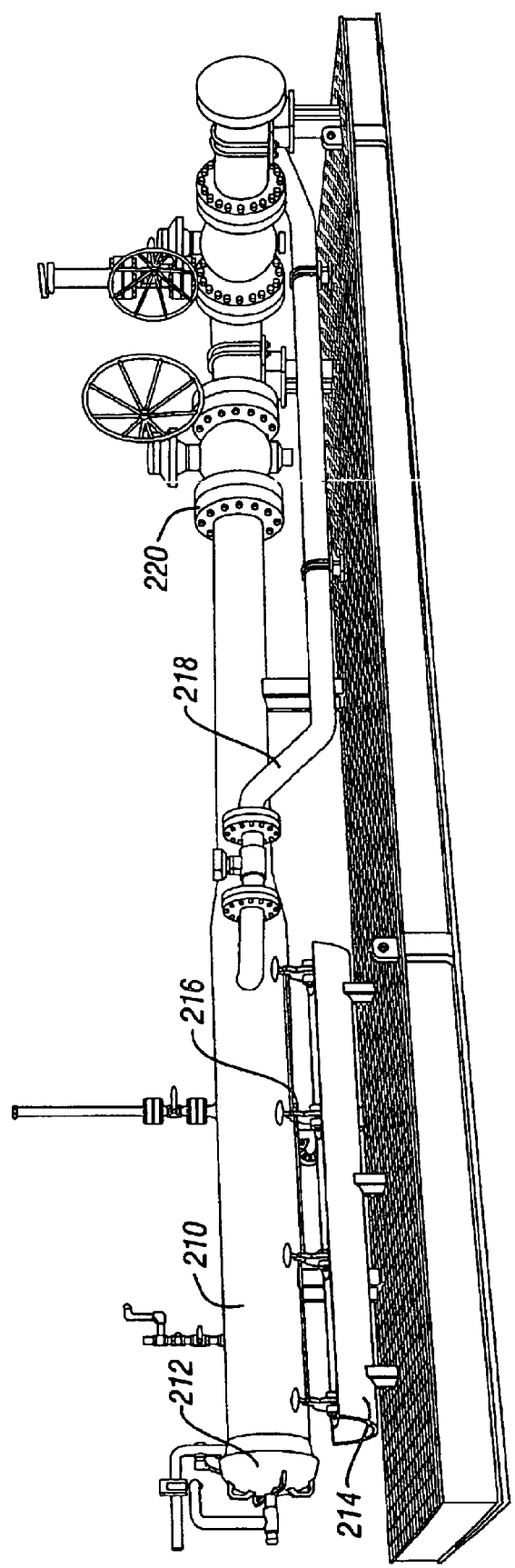
FIG. 10 is a more detailed description of the pig launcher above ground to be deployed with a filter.

FIG. 10 is a depiction of an above ground pig launcher associated with a pipeline. The pig launcher 210 is shown with a pig launcher opener 212 in the closed position. A holder 214 is shown with a filter cartridge carrier assembly 216 placed adjacent to the pig launcher. The filter cartridge carrier assembly 216 can be easily accessed to place into the pig launcher when needed. Bypass line 218 is also shown. Flange connection 220 that would be modified to include the sump plate used with this invention is also shown. The other piping and valves are those typical to this type of installation.

Other embodiments are within the scope of the following claims.

What we claim is:

1. A method for cleaning a fluid in the interior of a pipeline comprising:
   introducing a filter into a pig launcher of a pipeline wherein fluid in the pipeline will flow through the filter to an interior core of the filter;
   securing the filter inside the pig launcher so that it will remain in place while the fluid from the pipeline flows through the filter;

passing fluid from the pipeline to a launcher body and through the filter to remove impurities; and further allowing the fluid to flow from the core of the filter through the pipeline by providing a conduit from the filter core to the pipeline.

2. A method for cleaning the fluid in the interior of a pipeline of claim 1 further comprising the steps of:

passing a pig through the interior of the pipeline;

receiving the pig in a receiver body; and piping the fluid advancing in front of the pig into the launcher body containing the filter.

3. A method for cleaning the fluid in the interior of a pipeline of claim 2 further comprising:

removing the filter from the pig launcher;

introducing the pig into the pig launcher formerly holding the filter; and launching the pig from the pig launcher in the pipeline to a second pig receiver located in the pipeline.

4. A method for cleaning the fluid in the interior of a pipeline of claim 1 further comprising the steps of:

passing a pig through the interior of the pipeline;

receiving the pig in a receiver body; and piping the fluid advancing behind the pig into the launcher body containing the filter.

5. A method for cleaning the fluid in the interior of a pipeline of claim 4 further comprising:

removing the filter from the pig launcher;

introducing the pig into the pig launcher formerly holding the filter; and launching the pig from the pig launcher to a next pig receiver in the pipeline.

6. A method for cleaning the fluid in the interior of a pipeline of claim 1 further comprising introducing multiple filters in the pig launcher.

7. A method for cleaning the fluid in the interior of a pipeline of claim 6 wherein the filters are contained in the pig launcher and a cylindrical body extending from the pig launcher.

8. A method for cleaning the fluid in the interior of a pipeline of claim 1 further comprising the step of:

adapting a flange of the pipeline adjacent to the pig launcher to receive the conduit from the filter core.

9. A method for cleaning the fluid in the interior of a pipeline of claim 1 further comprising:

mounting multiple filters in a series such that more than one filter is sized to fit the inside diameter of the pig launcher;

connecting cores of the filters aligned along the length of the inside of the launcher body in a parallel series;

collecting the fluid from the cores of the filters at end of each parallel series; and passing the filter fluid through the pipeline.

10. A method for cleaning the fluid in the interior of a pipeline of claim 1 further comprising the step of:

enlarging the pig launcher by mounting a cylindrical part to the end of the launcher.

\* \* \* \* \*